UNITED STATES PATENT OFFICE.

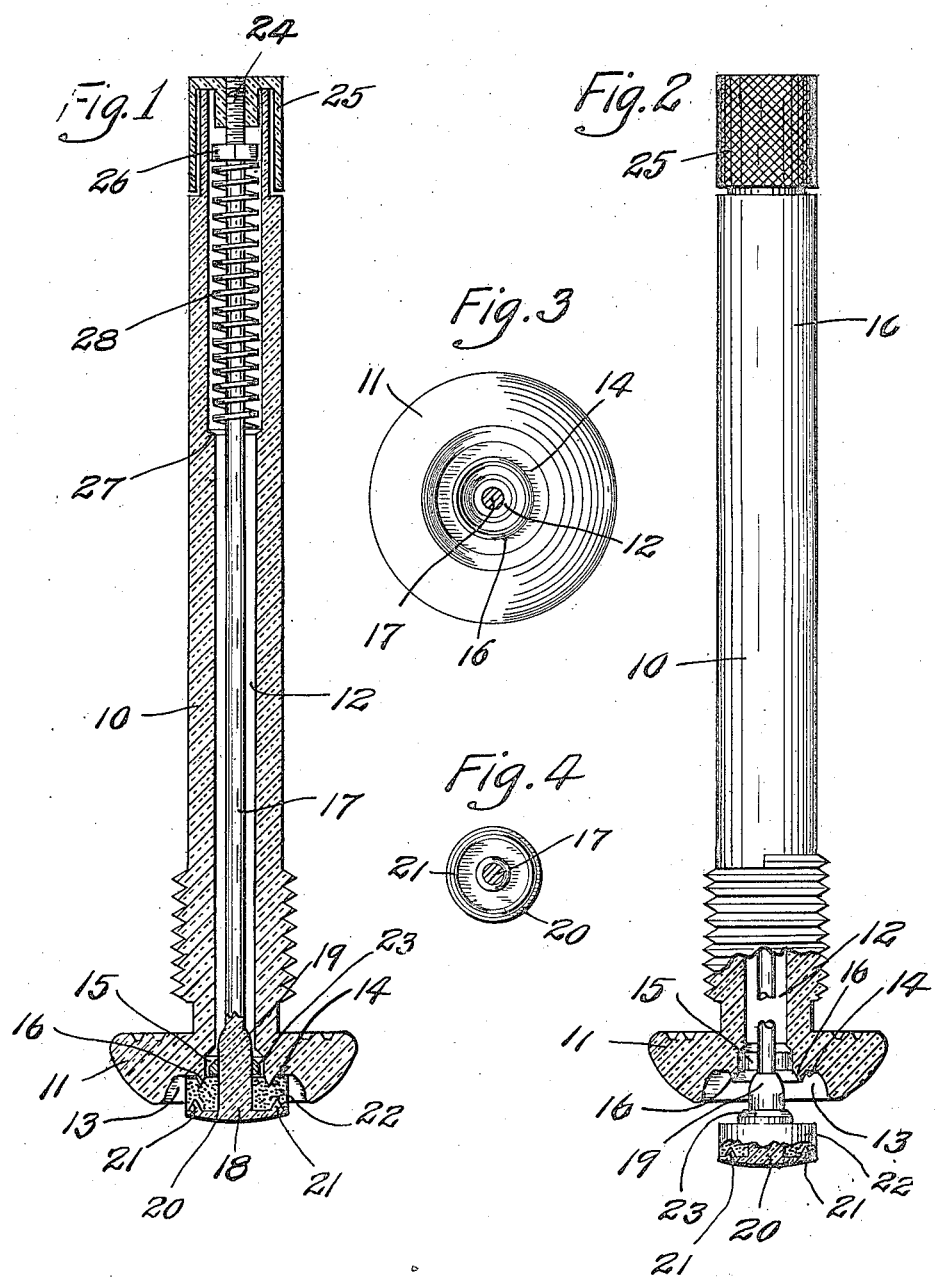

JOSEPH N. NEWSOM, OF ST. LOUIS, MISSOURI, ASSIGNOR, BY DIRECT AND MESNE ASSIGNMENTS, TO NEWSOM VALVE COMPANY, OF ST. LOUIS, MISSOURI, A CORPORATION OF MISSOURI.

PNEUMATIC VALVE.

1,262,239.   Specification of Letters Patent.   Patented Apr. 9, 1918.

Application filed March 17, 1916. Serial No. 84,768.

*To all whom it may concern:*

Be it known that I, JOSEPH N. NEWSOM, a citizen of the United States, residing at St. Louis, Missouri, have invented a certain new and useful Improvement in Pneumatic Valves, of which the following is a full, clear, and exact description, such as will enable others skilled in the art to which it appertains to make and use the same, reference being had to the accompanying drawings, forming part of this specification.

My invention relates generally to valves and more particularly to the type of valves utilized in connection with pneumatic tires, the principal object of my invention being to provide a comparatively simple, inexpensive and efficient valve which is constructed so as to reduce to a minmum the tendency of leakage or air between the gasket and the seat therefor or between the gasket and the stem and disk carrying same.

Further objects of my invention are to provide a valve having means for accurately and positively centering the gasket when the same is applied to its seat, further to proide a valve having a gasket the outer portion of which is caused to expand bodily outward or radially when under pressure, and further, to construct the parts of the valve which contact with both flat faces of the gasket with annular ribs arranged with respect to each other so as to bear upon and impinge against the faces of said gasket in different annular planes with the result that when the gasket is subjected to pressure, portions on each side of the body thereof will be forced or compressed in opposite directions radially with respect to the stem carrying the gasket, such disposition of the body of said gasket insuring a perfectly air-tight joint between said gasket and its seat.

With the foregoing and other objects in view, my invention consists in certain novel features of construction and arrangement of parts, hereinafter more fully described, claimed and illustrated in the accompanying drawings, in which—

Figure 1 is a vertical section taken through the center of a valve of my improved construction.

Fig. 2 is a side elevational view of the valve, a portion thereof being in section and with the gasket removed from the seat.

Fig. 3 is a plan view of the underside of the disk carried by the lower end of the valve housing.

Fig. 4 is a plan view of the inner face of the disk which is carried by the valve stem.

Referring by numerals to the accompanying drawings, 10 designates the tubular body of the valve, with the lower end of which is formed integral a disk 11. Formed in the underside of this disk and concentric with the opening 12 through the body of the valve is a circular recess 13, the bottom 14 of which is flat. The lower end of the opening 12 through the body 10 is reamed out or enlarged to form an annular chamber 15 and formed on the bottom 14 of the recess 13 around the outer edge of this chamber 15 is an annular rib 16 which is preferably V-shape in cross section.

Extending through the tubular body 10 is a valve stem 17, the lower portion of which is enlarged as designated by 18 and the upper end of said enlarged portion being rounded or dome-shaped as designated by 19.

Formed integral with the lower end of the enlarged portion 18 is a disk 20, the same being somewhat smaller in diameter than the recess 13 and formed on the inner face of said disk is an annular rib 21 which is preferably of inverted V-shape in cross-section, said rib being slightly larger in diameter than the rib 16 which is formed on disk 11.

Seated on top of disk 20 and around the lower portion of member 18 is an elastic gasket 22, preferably of rubber or an elastic composition and rigidly fixed in any suitable manner upon the enlarged portion 18 on top of said gasket is a collar 23 of such size as to have a working fit within chamber 15.

The upper end of stem 17 is threaded as designated by 24 so as to receive a tubular nut 25 which is loosely mounted on the upper end of the body 10.

Seated on the threaded upper end of the stem within tubular member 10 is a nut 26 and located on the valve stem below this nut and bearing upon an internal shoulder 27 within the body of the valve is a compression spring 28.

When the gasket of my improved valve is seated and the stem carrying said gasket is drawn upward through the body 10 by manipulation of the nut 25, the upper end of enlarged member 18 enters the lower end of the passage way 12 through the valve body and collar 23 enters and fits snugly within chamber 15, thereby providing centering means for bringing the top of the gasket into proper position with respect to the seat formed by flat surface 14 in recess 13 and depending rib 16. This centering action insures the return of the gasket to the same position upon its seat, for after the gasket has been once seated, the rib 16 will form a shallow groove in the top of said gasket, which latter by virtue of the centering action will always receive said rib 16 when the gasket is reseated.

When the gasket is compressed a considerable portion of the body near the outer edge or that portion outside the ribs 16 and 21 will be squeezed and expanded radially outward and by reason of the fact that rib 21 is larger in diameter than rib 16, the outwardly expanding portion of the gasket will be forced into close contact with the flat face 14 of the seat, thereby forming a very tight joint and preventing the leakage of air between the gasket and its seat. Likewise, the inner portion of the gasket or that portion immediately adjacent the member 18 will be squeezed or compressed radially inward by the movement of the ribs 16 and 21 toward each other, thus forming a tight joint and preventing leakage of air between said gasket, the disk 20, the collar 23 and member 18. By providing the ribs 16 and 21 on parts which contact with the elastic or compressible gasket, the body of the latter is squeezed radially in both directions when subjected to pressure and by forming one of said ribs larger in diameter than the other, the tendency of the ribs to cut through the gasket is minimized.

A valve of my improved construction is comparatively simple, can be easily and cheaply manufactured, is especially applicable for pneumatic tires and by the peculiar formation of the valve seat and the gasket carrying disk, the leakage of air through the valve is entirely eliminated when the gasket is positioned upon said seat and said gasket always returns to the same position when being reseated.

It will be readily understood that minor changes in the size, form and construction of the various parts of my improved valve can be made and substituted for those herein shown and described, without departing from the spirit of my invention, the scope of which is set forth in the appended claims.

I claim:

1. In a valve, a tubular body provided with a valve seat at one end around the opening through said body, a rib on said valve seat around said opening, a stem passing through the tubular body, a disk carried by said stem and arranged adjacent to the valve seat, a rib on the inner face of said disk, which rib and the rib on the valve seat are concentrically arranged and of different diameters, and a compressible gasket positioned on the disk and adapted to engage upon said valve seat, which gasket overlies and extends radially beyond both ribs, the rib on the disk being normally embedded in the gasket.

2. The herein described valve comprising a tubular body, a disk on the lower end thereof, a depending flange on the edge of the disk, a rib on the underside of the disk which rib is concentric with the opening through the tubular body, a stem passing through the tubular body, a disk on the lower end of said stem which disk is smaller in diameter than the space within the depending flange on the disk of the tubular body, a rib on top of the disk carried by the stem, which last mentioned rib is larger in diameter than the rib on the first mentioned disk, and a compressible gasket carried by the disk on the stem, a portion of which gasket lies outside the rib on the disk carried by the stem, the rib on the disk being normally embedded in said gasket.

3. The combination with a tubular body provided with a valve seat, of a valve stem and disk carried thereby, of concentric ribs formed on the adjacent faces of the valve body and disk, said ribs being of different diameters and a compressible gasket positioned on the disk, which gasket is larger in diameter than the ribs so as to wholly overlie and project beyond both of said ribs and the rib on the disk being normally embedded in said gasket.

4. In a valve of the class described, a tubular body provided with a valve seat around the opening through said body, a valve stem positioned in said body, a disk carried by said stem and arranged adjacent to the valve seat, a gasket carried by said disk and adapted to engage on the valve seat, and means on said seat and on the face of the disk to which the gasket is applied for causing the central portion of said gasket to be compressed radially inward and the outer portion thereof to be compressed radially outward when the gasket is forced onto the seat, the means on the face of the disk being normally embedded in said gasket.

5. The herein described valve comprising a tubular body provided with a valve seat around the opening through said body, a stem passing through the tubular body, a disk on said stem, a concentric rib on the inner face of said disk, and a gasket positioned on said disk and adapted to bear against the valve seat, which disk overlies and projects beyond the rib on the disk, and said concentric rib being normally embedded in the gasket.

In testimony whereof I hereunto affix my signature in the presence of two witnesses, this 10th day of March, 1916.

JOSEPH N. NEWSOM.

Witnesses:
M. P. SMITH,
A. B. LEWIS.